UNITED STATES PATENT OFFICE.

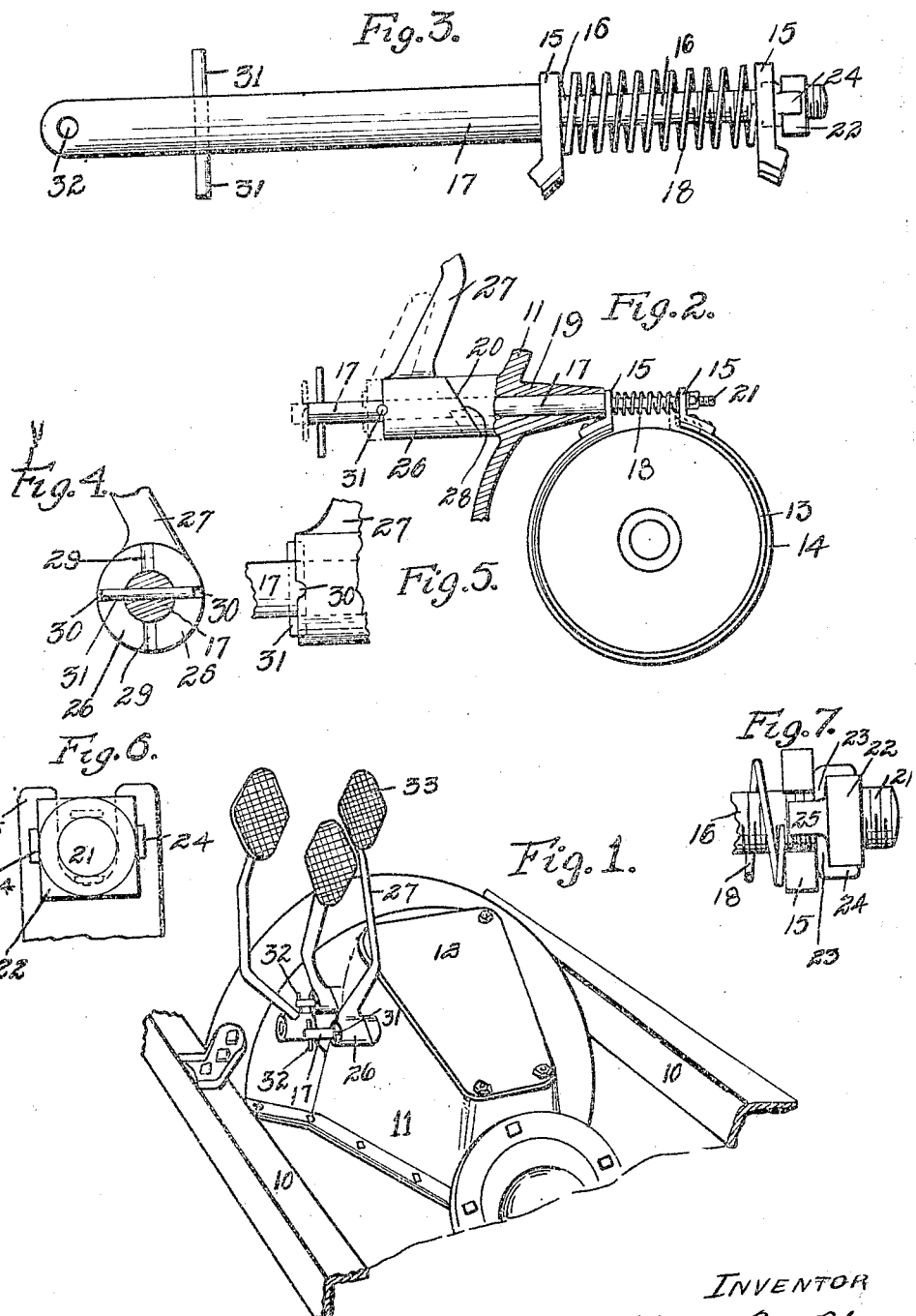

HARVEY M. STRONG, OF DES MOINES, IOWA.

TRANSMISSION-BAND ADJUSTER.

1,320,347.  Specification of Letters Patent.  Patented Oct. 28, 1919.

Application filed April 21, 1919. Serial No. 291,684.

*To all whom it may concern:*

Be it known that I, HARVEY M. STRONG, a citizen of the United States, and a resident of Des Moines, in the county of Polk and State of Iowa, have invented a certain new and useful Transmission-Band Adjuster, of which the following is a specification.

The object of my invention is to provide a transmission band adjuster of simple, durable and inexpensive construction.

More particularly it is my object to provide a transmission band adjuster included as a part of a transmission band controlling mechanism, and having parts so constructed and arranged that by simple and easy adjustment outside of the gear casing, the parts can be adjusted for tightening or loosening the transmission band.

With these and other objects in view my invention consists in the construction, arrangement and combination of the various parts of the device, whereby the objects contemplated are attained, as hereinafter more fully set forth, pointed out in my claim and illustrated in the accompanying drawings, in which:

Figure 1 shows a perspective view of a gear casing for transmission gearing mounted on the frame of a motor vehicle, said view showing part of my improved transmission band adjuster.

Fig. 2 shows a detail, sectional view of my improved transmission band adjuster.

Fig. 3 shows a detail view of the slidable rod.

Fig. 4 shows a sectional view of said rod and an end view of the bearing at the end of the lever.

Fig. 5 shows a rear elevation of the parts shown in Fig. 4, shown in a slightly different position.

Fig. 6 shows an end elevation of the slidable rod; and

Fig. 7 shows a top or plan view of the same.

My device is particularly designed for use with Ford transmission bands.

In the accompanying drawings I have used the reference numeral 10 to indicate generally the frame of the motor vehicle on which is mounted the transmission gear case 11 having the removable top or cover plate 12.

Within the gear case are several drums, one of which is illustrated in Fig. 2 and indicated by the reference character 13.

Surrounding the drum 13 is a broken band or the like 14, having at its ends the outwardly projecting members 15 provided with openings or notches to receive a reduced portion 16 of a shaft 17. Between the members 15 on the portion 16 is a coil spring 18. The shaft 17 is extended through a bearing 19 formed preferably on the casing 11, and having at its outer end a beveled face 20. The extreme end of the portion 16 of the shaft 17 is screw-threaded as at 21 and receives a nut 22.

The members 15 may consist of a pair of spaced arms, the entire member having the form of a fork, as illustrated, for instance, in Figs. 3 and 7.

For holding the nut 22 against rotation with relation to the arms of the member 15, there is provided a washer 23 between the nut 22 and the member 15, having arms 24 receiving the nut 22 and having an arm 25 projected between the arms of the member 15.

The arm 25 is preferably considerably narrower than the space between the arms of the member 15, so as to allow some rotation of the shaft 17 without causing the washer 23 to engage the arms of the member 15 and also the nut 22, for screwing said nut farther on or off the screw-threaded portion 21 of the shaft 17.

Mounted on the shaft 17 outside the casing 11 is a bearing 26 on a foot pedal 27. The bearing 26 has a beveled face 28 adapted to coact with the beveled face 20 of the bearing 19.

In the outer face of the bearing 26 are alined grooves 29 and also alined grooves 30. The grooves 30 are arranged at ninety degree angles with relation to the grooves 29.

Mounted in the shaft 17 is a pin 31 which abuts against the bearing 26 and is received selectively in the grooves 30 or 29.

The shaft 17 projects beyond the bearing 26, as clearly illustrated in Figs. 1, 2 and 3, and has in its outer end a pin or groove 32.

It will be seen that when the foot lever pedal 17 is in its normal position, the shaft 17 will be held at the limit of its movement toward the right by means of the spring 18, and the transmission band 14 will be in its loose position.

When the foot pedal 33 is actuated, the beveled face 28 will travel on the beveled face 20 for thereby forcing the shaft 17 longitudinally toward the left, and also for imparting limited rotation to said shaft through the medium of the pin 31. The rotation of the shaft, however, has no effect on account of the play of the arm 25 in the space between the arms of the member 15. The longitudinal movement of said shaft tends to draw the right-hand member 15 toward the left-hand member 15 (see Fig. 2), and thereby tightens the transmission band 14 of the drum 13.

After the band has been tightened and the arm 25 engages one of the arms of the member 15, the drum 13 will be actuated for the desired purpose.

It is well known that the band 14 should be frequently adjusted in a car which has constant use. However, on account of the difficulty and inconvenience of making such adjustment, which requires the removal of the member 12 and the manipulation of grease covered parts within the gear case, such adjustment is usually neglected, or postponed as long as possible.

With my improved adjuster, however, the adjustment may be quickly and easily made at any time in the following manner.

The operator may grasp the handle or pin 32 and pull the shaft 17 longitudinally until the pin 31 clears the grooves 30, whereupon the shaft 17 may be rotated until the pin 31 is opposite the grooves 29. The operator may then release the pin 32 and the shaft will have been turned a quarter revolution with relation to the nut 22.

It will, of course, be obvious that the direction of rotation of said shaft 17 determines whether or not the nut 22 is screwed farther on or farther off the screw-threaded portion 21 of the shaft.

It will be seen that such adjustment may be very quickly and easily made without the necessity of removing the transmission cover case or working among oil covered parts, and that the adjustment can be made with great accuracy.

Where the threads of the member 21 are twenty to the inch, the adjustment can be made to one-eightieth of an inch.

Some changes may be made in the construction and arrangement of the parts of my improved transmission band adjuster without departing from the essential features and purposes of my invention, and it is my intention to cover by my claim any modified forms of structure or use of mechanical equivalents which may be reasonably included within the scope of the claim.

I claim as my invention:

The combination of a drum; a broken band thereon, having projecting end members; a support including a bearing having a beveled face; a shaft mounted in said support having a reduced portion extended through said end members; a nut on said shaft; a spring between said end members; means on said shaft for locking said nut on the shaft with relation to one of said end members, and adapted to permit limited rotary movement of the shaft and nut with relation to said end member; a lever having a bearing mounted on said shaft, provided with a beveled face for coacting with said first beveled face, said last bearing having spaced, alined pairs of grooves in said face; a pin extended through said shaft and selectively received in one pair of said grooves, said shaft projecting beyond said bearings; and a handle device on the projected end of said shaft.

Des Moines, Iowa, April 2, 1919.

HARVEY M. STRONG.